Patented June 30, 1925.

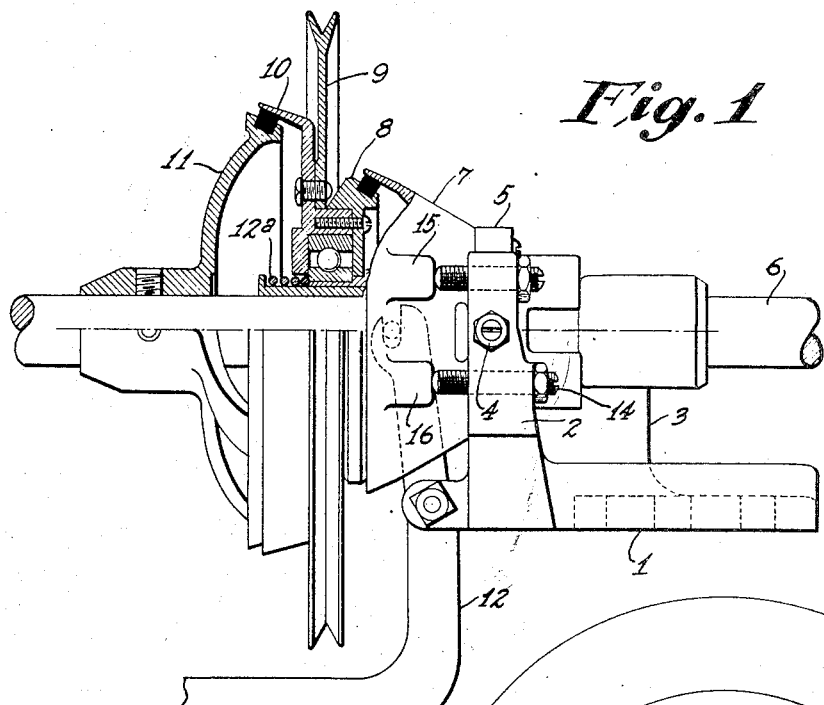
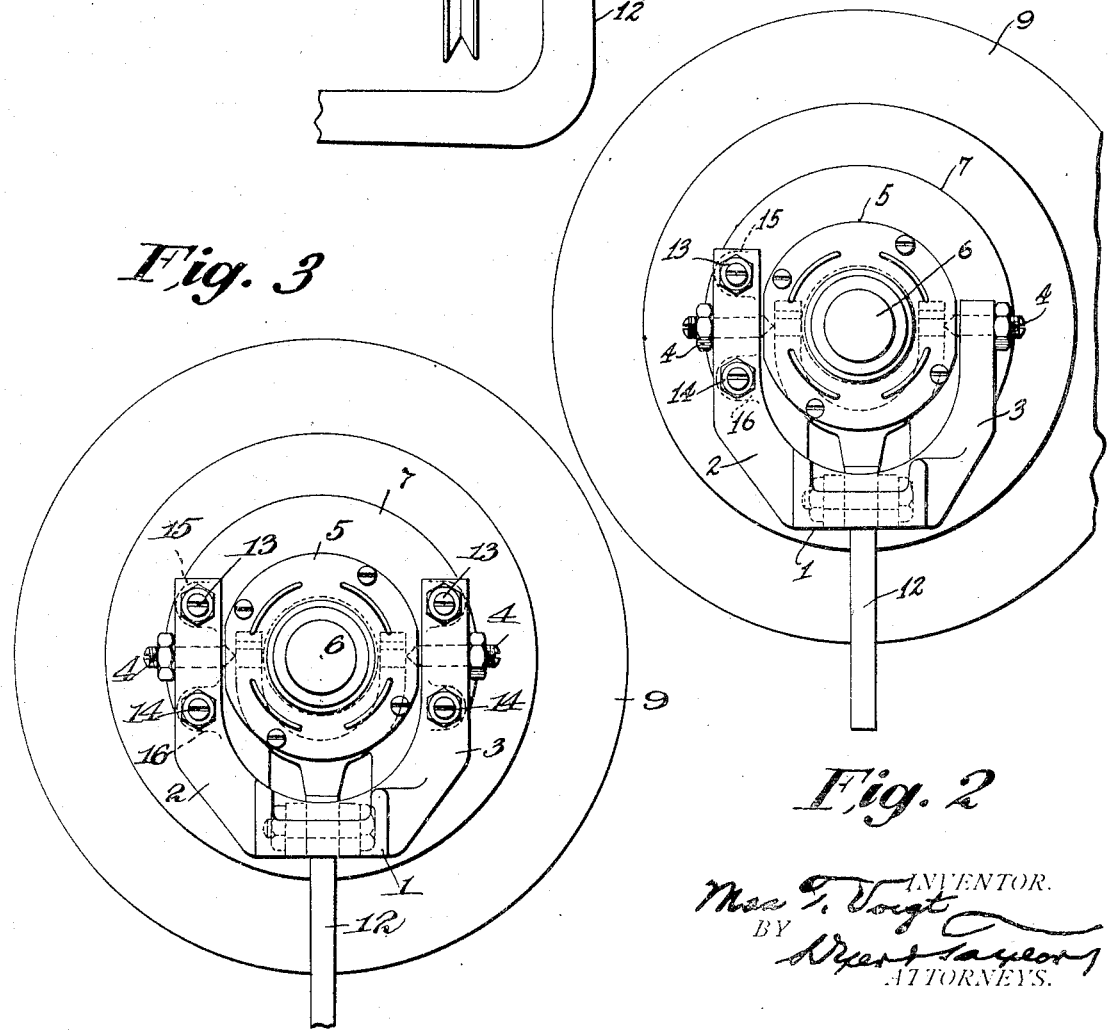

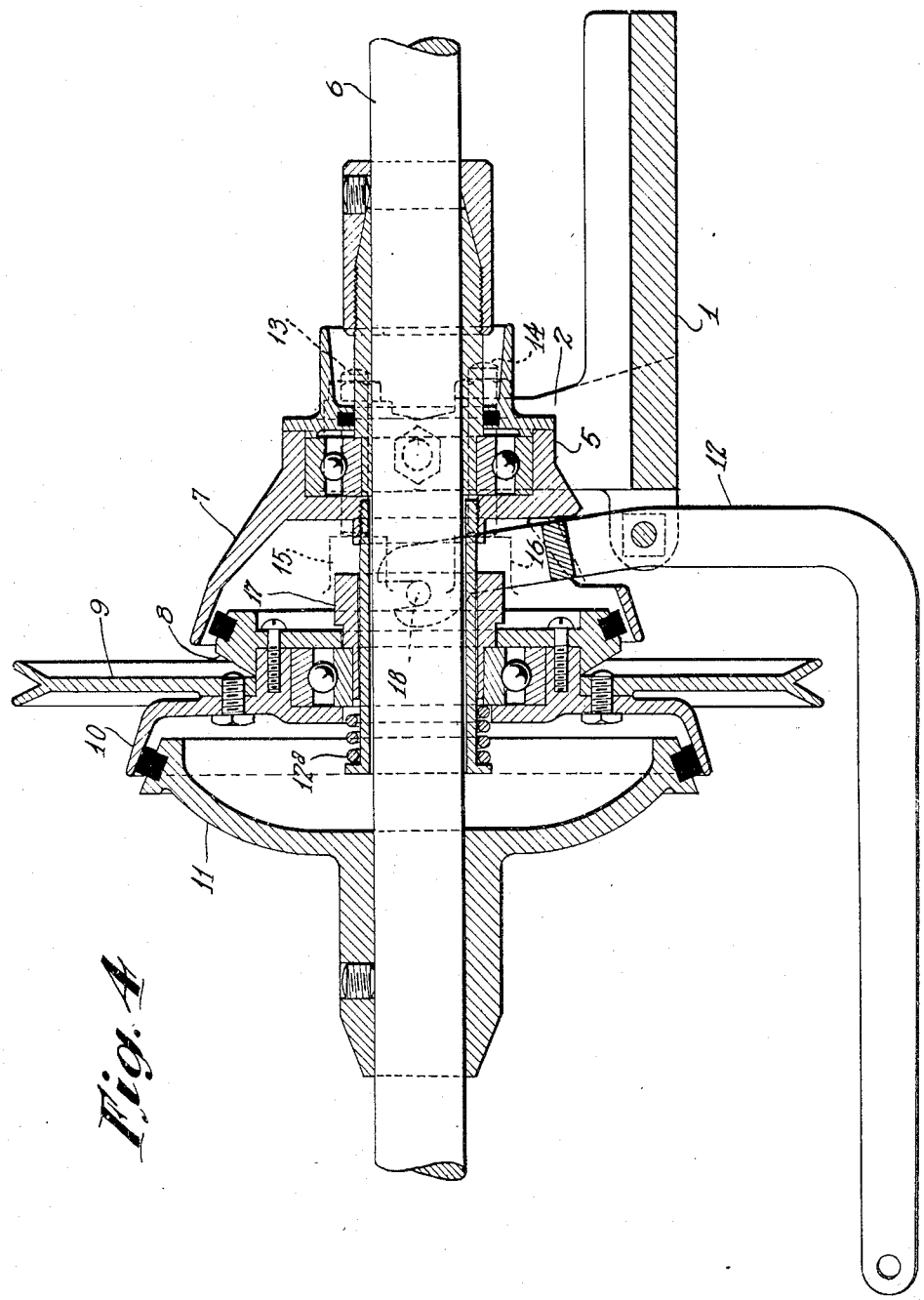

1,544,080

UNITED STATES PATENT OFFICE.

MAX T. VOIGT, OF READING, PENNSYLVANIA, ASSIGNOR TO LOUIS FRANKEL, OF NEW YORK, N. Y.

TRANSMISSION APPARATUS.

Application filed July 29, 1922. Serial No. 578,296.

*To all whom it may concern:*

Be it known that I, MAX T. VOIGT, a citizen of the United States, and a resident of Reading, county of Berks, and State of Pennsylvania, have invented a certain new and useful Improvement in Transmission Apparatus, of which the following is a specification.

The present invention relates to apparatus for transmitting power from a continuously operating power line shaft to a plurality of mechanisms, such as sewing machines, adapted to be operated therefrom, and is particularly applicable to use in connection with the type of apparatus illustrated and described in my Patents No. 1,431,198 of October 10, 1922, and No. 1,444,573 of February 6, 1923, although its use is not confined to such devices, but may be employed in connection with other forms of power transmission apparatus.

The object of the invention is to provide means for alining power transmitting elements independently of the supports or other instrumentalities with which they may be associated. A further object is to provide means whereby in line shafting having a plurality of pivoted bearings each bearing may be secured in alinement with the other bearings.

These and further objects will more fully appear in the following specification and accompanying drawings considered together or separately.

In the accompanying drawings, in which like parts in all of the several figures are designated by corresponding characters of reference, is illustrated one embodiment of the invention.

In the drawings

Fig. 1 is a side elevation, partly in section, of a transmission apparatus embodying the invention.

Fig. 2 is an end elevation of the same.

Fig. 3 is a similar view showing a modification, and

Fig. 4 is a longitudinal section of the device.

In the embodiment of the invention illustrated 1 designates a standard or pedestal which may be supported in any desired manner and projecting upwardly from the same is a pair of spaced arms 2 and 3, each provided with a threaded perforation in its upper end to receive a conically pointed set screw 4. The screws 4 are in axial alinement whereby the transmission proper is pivoted to the pedestal 1.

The set screws 4 engage diametrically opposed conical recesses in an element 5. The element 5 comprises a cylindrical portion in which a power shaft 6 has a bearing, and a conically recessed extension 7 in axial alinement therewith, which extension forms the stationary member of a brake, the movable member 8 of which is carried on a pulley 9 which in turn is rotatably mounted on an extension of the element 5.

The pulley 9 carries on its side opposite the brake member 8 a female clutch member 10 adapted to cooperate with a male clutch member 11 fast to the shaft 6. A shifter 12 pivoted to the pedestal 1, extends through a gap in the extension 7, and a crutch at the upper end thereof engages pins 18 extending diametrically from the hub 17 of the pulley whereby the latter may be moved longitudinally of the shaft to be clutched to the same through the member 11 and be rotated therewith. A spring $12^a$ bearing against a flange on an extension of the element 5 and against the pulley 9 will break the contact between the members 10 and 11, and engage the brake member 8 with the stationary element 5 to arrest the rotation of the pulley when the shifter is released.

The arm 2, in the embodiment of the invention illustrated, is extended upward, and is provided with set screws 13 and 14 one above and one below the set screw 4. Each of the set screws 13 and 14 is threaded in the arm 2 and is provided with a jam nut by means of which the screw may be secured in position. Each set screw 13 and 14 bears against a boss 15 or 16 on the element 5.

When installing a line shaft, such as 6 composed of a plurality of sections coupled together, the bolts 13 and 14 are backed away from the bosses 15 and 16 and the shaft, as a whole, is carefully alined without the load thereon. The fact that the bearing members 5—7 are pivoted, as on the screws 4, will facilitate the alining of the shaft. When the shaft is in proper alinement the bolts 14 and 15 are carefully screwed up each to engage its respective boss 15 or 16, and the jam nuts on the bolts are brought up against the arm 2 or 3 to lock the bolts in position to prevent pivoting of the bearing members and lock.

If, by any chance, as by the bolts 13 or 14 becoming loose, or if the pull upward of a belt or the pull downward of a shift lever 12, pull a shaft section out of alinement the same may be brought back to proper position by manipulation of the bolts 13 and 14.

Any number of adjusting set screws 13 may be employed as desired or necessary, and they may be so positioned as to resist the pull of the belt in any direction. In Fig. 3 four adjusting screws are shown, two carried by the arm 2, and two by the arm 3.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

Claims:—

1. Apparatus of the character described, comprising a constantly rotating body, a member adapted to be rotated thereby, means for moving the member to engage the body, and pivotal means for adjusting the body relatively to the member.

2. Apparatus of the character described, comprising a constantly rotating body, a member adapted to be rotated thereby, means for moving the member to engage the body, and pivotal means for adjusting the angle of the body relatively to the member.

3. Apparatus of the character described, comprising a constantly rotating body, a member adapted to be rotated thereby, an element adapted to support the body, means for causing relative movement of the member and body to engage one with the other, and means for pivoting the element and causing relative movement of the member and body.

4. Apparatus of the character described, comprising a constantly rotating body, a member adapted to be rotated thereby, an element adapted to support the body, means for causing relative axial movement of the member and body to engage one with the other, and means for pivoting the element causing relative angular movement of the member and body.

5. Apparatus of the character described, comprising a constantly rotating clutch member, a pulley, a clutch member carried by the pulley and adapted to be engaged by the constantly rotating member, an element in normal axial alinement with the pulley, a brake member carried by the pulley, a brake member carried by the element, said pulley being rotatable relatively to the element, and means for adjusting the relative angular positions of the clutch members.

6. Apparatus of the character described, comprising a constantly rotating clutch member, a pulley, a clutch member carried by the pulley and adapted to be engaged by the constantly rotating member, an element in normal axial alinement with the pulley, a brake member carried by the pulley, a brake member carried by the element, said pulley being rotatable relatively to the element, means for causing relative axial movement of the pulley and element, and means for adjusting the relative angular positions of the clutch members.

7. Apparatus of the character described, comprising a constantly rotating clutch member, a pulley, a clutch member carried by the pulley and adapted to be engaged by the constantly rotating member, an element in normal axial alinement with the pulley, a brake member carried by the pulley, a brake member carried by the element, said pulley being rotatable relatively to the element, means for automatically causing relative axial movement of the pulley and element, and means for adjusting the relative angular positions of the clutch members.

8. Apparatus of the character described, comprising a constantly rotating clutch member, a pulley, a clutch member carried by the pulley and adapted to be engaged by the constantly rotating member, an element in normal axial alinement with the pulley, a brake member carried by the pulley, a brake member carried by the element, said pulley being rotatable relatively to the element, a spring for causing relative axial movement of the pulley and element, and means for adjusting the relative angular positions of the clutch members.

9. Apparatus of the character described, comprising a support, an element pivotally mounted in the support, a constantly rotating shaft having a bearing in the element, a clutch member carried by the shaft, a wheel carried by the element, a clutch member carried by the wheel and adapted to cooperate with the clutch member of the shaft, means for moving the wheel axially to engage the clutch members, and adjusting screws carried by the support and engaging the element on opposite sides of the axial line of the shaft whereby the shaft and its clutch member may be adjusted perpendicularly of the axial line.

This specification signed and witnessed this 12th day of July, 1922.

MAX T. VOIGT.

Witnesses:
LOUIS FRANKEL,
JULIUS E. HANSEN.